United States Patent
Weissberger et al.

(10) Patent No.: US 12,518,863 B2
(45) Date of Patent: Jan. 6, 2026

(54) SYSTEMS FOR DYNAMIC ASSESSMENT OF UPPER EXTREMITY IMPAIRMENTS IN VIRTUAL/AUGMENTED REALITY

(71) Applicant: XR Health IL LTD, Tel Aviv (IL)

(72) Inventors: Omer Weissberger, Even-Yehuda (IL); Tal Arbel, Hod-Hasharon (IL); Miki Levy, Misgav Dov (IL)

(73) Assignee: XR Health IL LTD, Tel Aviv (IL)

( * ) Notice: Subject to any disclaimer, the term of this patent is extended or adjusted under 35 U.S.C. 154(b) by 552 days.

(21) Appl. No.: 17/865,765

(22) Filed: Jul. 15, 2022

(65) Prior Publication Data

US 2022/0351824 A1    Nov. 3, 2022

Related U.S. Application Data

(63) Continuation of application No. PCT/IB2021/000022, filed on Jan. 21, 2021.
(Continued)

(51) Int. Cl.
*G16H 20/30* (2018.01)
*G06T 19/00* (2011.01)
(Continued)

(52) U.S. Cl.
CPC ........... *G16H 20/30* (2018.01); *G06T 19/006* (2013.01); *G06V 40/23* (2022.01); *G16H 10/60* (2018.01)

(58) Field of Classification Search
CPC ........ G16H 20/30; G16H 10/60; G16H 40/67; G16H 50/20; G16H 50/30; G06T 19/006;
(Continued)

(56) References Cited

U.S. PATENT DOCUMENTS

| 2014/0307927 A1* | 10/2014 | Folmer | A61B 5/4866 |
| | | | 382/107 |
| 2019/0038181 A1* | 2/2019 | Domeika | A61B 5/1071 |
| (Continued) | | | |

FOREIGN PATENT DOCUMENTS

| WO | WO-2019/071166 A1 | 4/2019 |
| WO | WO-2021/148880 A1 | 7/2021 |

OTHER PUBLICATIONS

International Search Report and Written Opinion for International Application No. PCT/IB2021/000022 mailed May 24, 2021.

*Primary Examiner* — Akwasi M Sarpong
*Assistant Examiner* — Michael L Burleson
(74) *Attorney, Agent, or Firm* — Greenberg Traurig, LLP (57) ABSTRACT

An extended reality-based system for dynamic assessment of upper extremity impairments is disclosed. A virtual environment is provided to a user. A target path is received. A sensory stimulus is presented to the user. Three-dimensional position information is determined for one or more body part defining a recorded path. A plurality of motion parameters corresponding to a user response to the stimulus are determined by: comparing the recorded path to the target path, determining a smoothness metric of the recorded path, determining starting coordinates and ending coordinates of the path, determining a first time period from presentation of the sensory stimulus to when motion of the one or more body part begins, and determining a second time period for motion between the starting coordinates and the ending coordinates. At least one index indicative of upper extremity impairment from the plurality of motion parameters.

15 Claims, 5 Drawing Sheets

Related U.S. Application Data

(60) Provisional application No. 62/963,738, filed on Jan. 21, 2020.

(51) Int. Cl.
 *G06V 40/20* (2022.01)
 *G16H 10/60* (2018.01)

(58) Field of Classification Search
 CPC ......... G06V 40/23; A61B 5/1122; A61B 5/11; G06F 3/011; G06F 3/017
 See application file for complete search history.

(56) References Cited

U.S. PATENT DOCUMENTS

| | | | |
|---|---|---|---|
| 2020/0012336 A1* | 1/2020 | Orr | A61B 5/486 |
| 2020/0143599 A1* | 5/2020 | Holz | G06F 3/00 |

* cited by examiner

SYSTEMS FOR DYNAMIC ASSESSMENT OF UPPER EXTREMITY IMPAIRMENTS IN VIRTUAL/AUGMENTED REALITY

CROSS-REFERENCE TO RELATED APPLICATION

This application is a continuation of International Application PCT/IB2021/000022, filed Jan. 21, 2021, which claims the benefit of U.S. Provisional Patent Application No. 62/963,738, filed on Jan. 21, 2020, each of which is hereby incorporated by reference in its entirety.

BACKGROUND

Embodiments of the present disclosure generally relate to dynamic assessment of upper extremity impairments in virtual reality (VR) and/or augmented reality (AR) environments.

BRIEF SUMMARY

According to embodiments of the present disclosure, methods of and computer program products for dynamic assessment of upper extremity impairments in virtual/augmented reality are provided. In various embodiments, a virtual environment is provided to a user via an extended reality system. A target path is received. A sensory stimulus is presented to the user within the virtual environment. The sensory stimulus instructs the user to follow the target path by moving one or more body part of the user. Three-dimensional position information for the one or more body part are determined. The three-dimensional position information define a recorded path. A plurality of motion parameters corresponding to a user response to the stimulus is determined by: comparing the recorded path to the target path, determining a smoothness metric of the recorded path, determining starting coordinates and ending coordinates of the path, determining a first time period from presentation of the sensory stimulus to when motion of the one or more body part begins; and determining a second time period for motion between the starting coordinates and the ending coordinates. At least one index indicative of upper extremity impairment is determined from the plurality of motion parameters. In some embodiments, the plurality of motion parameters comprises range of motion, quality of movement, response time, peak velocity, efficiency, fatigue, and/or tremor. In some embodiments, determining the at least one index comprises providing the plurality of motion parameters to a learning system.

In various embodiments, a system includes an extended reality system adapted to display a virtual environment to a user, a plurality of sensors coupled to the user, and a computing node including a computer readable storage medium having program instructions embodied therewith. The program instructions are executable by a processor of the computing node to cause the processor to perform a method where a virtual environment is provided to a user via an extended reality system. A target path is received. A sensory stimulus is presented to the user within the virtual environment. The sensory stimulus instructs the user to follow the target path by moving one or more body part of the user. Three-dimensional position information for the one or more body part are determined. The three-dimensional position information define a recorded path. A plurality of motion parameters corresponding to a user response to the stimulus is determined by: comparing the recorded path to the target path, determining a smoothness metric of the recorded path, determining starting coordinates and ending coordinates of the path, determining a first time period from presentation of the sensory stimulus to when motion of the one or more body part begins; and determining a second time period for motion between the starting coordinates and the ending coordinates. At least one index indicative of upper extremity impairment is determined from the plurality of motion parameters. In some embodiments, the plurality of motion parameters comprises range of motion, quality of movement, response time, peak velocity, efficiency, fatigue, and/or tremor. In some embodiments, determining the at least one index comprises providing the plurality of motion parameters to a learning system.

In various embodiments, a computer program product includes a computer readable storage medium having program instructions embodied therewith. The program instructions are executable by a processor of the computing node to cause the processor to perform a method where virtual environment is provided to a user via an extended reality system. A target path is received. A sensory stimulus is presented to the user within the virtual environment. The sensory stimulus instructs the user to follow the target path by moving one or more body part of the user. Three-dimensional position information for the one or more body part are determined. The three-dimensional position information define a recorded path. A plurality of motion parameters corresponding to a user response to the stimulus is determined by: comparing the recorded path to the target path, determining a smoothness metric of the recorded path, determining starting coordinates and ending coordinates of the path, determining a first time period from presentation of the sensory stimulus to when motion of the one or more body part begins; and determining a second time period for motion between the starting coordinates and the ending coordinates. At least one index indicative of upper extremity impairment is determined from the plurality of motion parameters. In some embodiments, the plurality of motion parameters comprises range of motion, quality of movement, response time, peak velocity, efficiency, fatigue, and/or tremor. In some embodiments, determining the at least one index comprises providing the plurality of motion parameters to a learning system.

DETAILED DESCRIPTION

In physical medicine and rehabilitation, also called physical therapy or physiotherapy, patients work with a physical therapist to enhance and/or restore their functional ability (and quality of life) after suffering physical impairment or disability. In general, a program of physical therapy is based on an individual's history and the results of a physical examination to arrive at a diagnosis. Assessment of a patient's abilities and performance is an important part of any rehabilitation process. Assessment enable the patient and the clinician to quantify motor abilities and provide an objective value regarding a patient's condition and functional abilities.

Upper Extremity (UE) is important in the rehabilitation process. In the initial stage, it enables better understandings of the patient's condition, and supports the testing and evaluation processes, allowing the clinician to direct his treatment and select the therapeutic methods and means. Assessing a patient's performance over time during the rehabilitation process enables the clinician to assess the efficiency of the rehabilitation process and obtain important insights and better understanding on the rehabilitation progress. This enables the clinician to re-assess his therapeutic direction and re-consider the patient treatment.

For patients, understanding performance can contribute to health condition self-awareness. In addition, when patients can see their rehabilitation related abilities in a quantified way and track them over time, it will naturally motivate them to improve their results and get better adherence and engagement.

The process of rehabilitation lacks approachable and efficient objective indices that reflect a patient's performance and enable tracking progression over time. Such indices would also provide clinical information about a patient's condition in comparison to healthy population or compared to the population with the same pathology.

Various manual assessment methods may be used to assess a patient's upper extremities. For example, Manual Muscle Testing (MMT) is a set of tests that may be used to assess the maximum force a muscle is able to generate, and quantify it using a scale of 0-5. Difference MMT techniques are relevant to different contexts and are not always equivalent or comparable.

For another example, Range of Motion (ROM) tests focus on the angular distance of a certain joint, measured in the anatomical plane. Range of motion indicates how much a patient can move their body. For example, a patient with 90 degrees shoulder Flexion can move their shoulder in front of themselves, reaching the height of the shoulder.

Functional questionnaires aim to quantify the ability of the upper extremities in activities of daily living. These questionnaires provide an ensemble view of a variety of tasks that require active use of the upper extremities. Each question has numerical scale. After completing the questionnaire, the results are summarized to provide a score that reflects clinical insights on a patient's upper extremity functionality. For example, the Upper Extremity Functional Index (UEFI), Disabilities of the Arm, Shoulder and Hand (DASH), and Shoulder Pain and Disability Index (SPADI) may be employed.

Shoulder disorders, for example, are one of the major health problems in clinical practice, and shoulder pain is the third most common type of musculoskeletal pain after spinal and knee pain. The annual prevalence of shoulder pain accompanied by disability in the general population is approximately 20%, with the rates increasing among the elderly. The quantification of patients is necessary not only for the evaluation of novel therapies, but also for the evaluation of outcome measures of impairment and disability. Questionnaires and functional measurements are useful to investigators to measure the impact of a disease on the performance of daily activities. Shoulder function may be assessed by methods such as muscle strength, range of motion, and questionnaires specific to the shoulder region.

The various methods outlined above suffer from low reliability, low validity, and ceiling and floor effects. In addition, these methods require the clinicians to be alongside the patient while performing the assessment process.

Accordingly, there is a need for solutions that better analyze patients' performance with a reliable and valid automated system, to provide higher resolution and detailed insights on patients performance and condition. Such reliable methods enable assessment in the context of tele-rehabilitation, which does not require for a clinician and patient to be in the same location.

In various embodiments of the present disclosure, VR is used in the rehabilitation context to promote task oriented and repetitive movement training of motor skills while using a variety of stimulating environments. Such approaches can increase patient motivation, while extracting objective and accurate information that enables a patient's progress to be monitored. VR provides a feeling of immersion within the simulated environment so that a patient's behavior during a session resembles as much as possible the one that they would have in the real world.

Various approaches to motion capture permit the transfer of the actual movement of the patient to a virtual environment, for example, inertial measurement technology. In various embodiments of the present disclosure, VR technology increases the range of possible tasks, partly automating and quantifying therapy procedures and improving patient motivation using real-time task evaluation and reward. It also permits the standardization of tasks and the recording of kinematic data during the execution of these tasks.

In various embodiments, computerized methods are provided to evaluate upper extremity functions in extended reality (XR). Extended reality (XR) is a term referring to all real-and-virtual combined environments and human-machine interactions generated by computer technology and wearables. It includes representative forms such as augmented reality (AR), mixed reality (MR) and virtual reality (VR) and the areas interpolated among them. These methods provide an assessment of a user's neuro-musculoskeletal abilities and enables tracking progression of these abilities over time.

The approaches described in further detail below provide an easy to interpret and approachable means for gathering clinical information on neuro-musculoskeletal processes. Monitoring, data recording, algorithms, and calculations are executed without patient intervention in the ongoing evaluation of their performance.

In various embodiments, the present disclosure enables using Extended Reality (XR) to evaluate upper extremity functions and understand relevant impairments, weaknesses and change over time. Neuromusculoskeletal rehabilitation principles are combined and immersed into to the XR abilities which results in the following advantages.

High tracking quality—XR allows the formation of a human body model describing the spatial and relational dispositional of the body and its parts. An XR system uses kinematic data to form a model of the body be overlaid with sensory data that is supplied by the computer-generated displays. For an effective XR experience, there is consistency between proprioceptive information and sensory feedback. This is done by the correct capturing of the movement of the user, and simulating it in the virtual environment, in order to increase a sense of immersion. Hardware such as Oculus Quest and HTC Vive Focus allow tracking samples in a very high rate per second, with position accuracy of under 1 millimeter, and rotation precision of 0.1 degrees and under, according to manufacturer's statement. This results in high tracking quality, which provides kinematic raw data that enables precise and accurate data analysis.

Live feedback—The infrastructure of systems according to the present disclosure use live communication with a database, thus enabling live algorithmics that provide clinical assessment of the upper extremity. This system infrastructure enables measurement of sequence and environment changes in real time according to the users' performance. This avoids ceiling and floor effects that may result from applying the same protocol in all circumstances.

Quantify upper extremity performance—Systems according to the present disclosure provide patients and clinicians with tools that can quantify clinical indexes such as quality of movement, efficiency of movement, and peak velocity, response time and accuracy of movement. These features enable providing a clinician and patient an objective value that can give clinical information about a patient's performance and reflect whether the treatment is beneficial. Alternative approaches do not provide the ability to quantify these indexes, and may involve laboratory equipment that is expansive and clumsy to use.

Relevant sensory activation—Proprioception is the ability to sense the position of the muscles, and the relative position among contiguous body parts. While using XR, the patient eyesight is blocked by the XR Headset, so he is unable to see himself moving his upper trunk. This makes some tasks such as motion coordination, automatic body responses and awareness of self-position across the space much harder. As a result, such approaches place additional requirements on other sensors, which may accelerate the treatment and increase its effectiveness.

Gamifying the rehabilitation process—Using XR systems transforms the upper extremity evaluation and practice from a boring and repetitive training into a fun game by designing the virtual/augmented environment. Consequently, the player is focused on the game and its performance, creating external focus on the upper extremity evaluation and training, which has positive clinical influence.

Tele-rehabilitation—Systems according to the present disclosure include the ability to adjust and perform upper extremity assessment and training in tele-rehabilitation while the clinician is required to directly supervise the patient. The clinician has the option to allow the patient to perform the prescribed medical rehabilitation exercises and assess his upper extremity from miles away.

Early detection—In many conditions (e.g., MS, Parkinson) it is crucial to detect the progression of the disease as early as possible. The present disclosure provides tools for early detections of many conditions that have motor or cognitive effects on the patient's performance and can detect slight changes in posture, stability, smoothness of motion, fatigue over time and much more. Combined with TELE capabilities it can provide a revolutionizing tool.

It will be appreciated that a variety of virtual and augmented reality devices are known in the art. For example, various head-mounted displays providing either immersive video or video overlays are provided by various vendors. Some such devices integrate a smart phone within a headset, the smart phone providing computing and wireless communication resources for each virtual or augmented reality application. Some such devices connect via wired or wireless connection to an external computing node such as a personal computer. Yet other devices may include an integrated computing node, providing some or all of the computing and connectivity required for a given application.

Virtual or augmented reality displays may be coupled with a variety of motion sensors in order to track a user's motion within a virtual environment. Such motion tracking may be used to navigate within a virtual environment, to manipulate a user's avatar in the virtual environment, or to interact with other objects in the virtual environment. In some devices that integrate a smartphone, head tracking may be provided by sensors integrated in the smartphone, such as an orientation sensor, gyroscope, accelerometer, or geomagnetic field sensor. Sensors may be integrated in a headset, or may be held by a user, or attached to various body parts to provide detailed information on user positioning.

In various embodiments, a user is furnished with a VR or AR system. As noted above, a VR or AR system will generally have integrated motion sensors. In addition, additional motions sensors may be provided, for example to be handheld. This allows tracking of multiple patient attributes while they interact with a scene. In this way, systematic and reproducible scenarios may be used to assess the subject's function.

Figure 1:
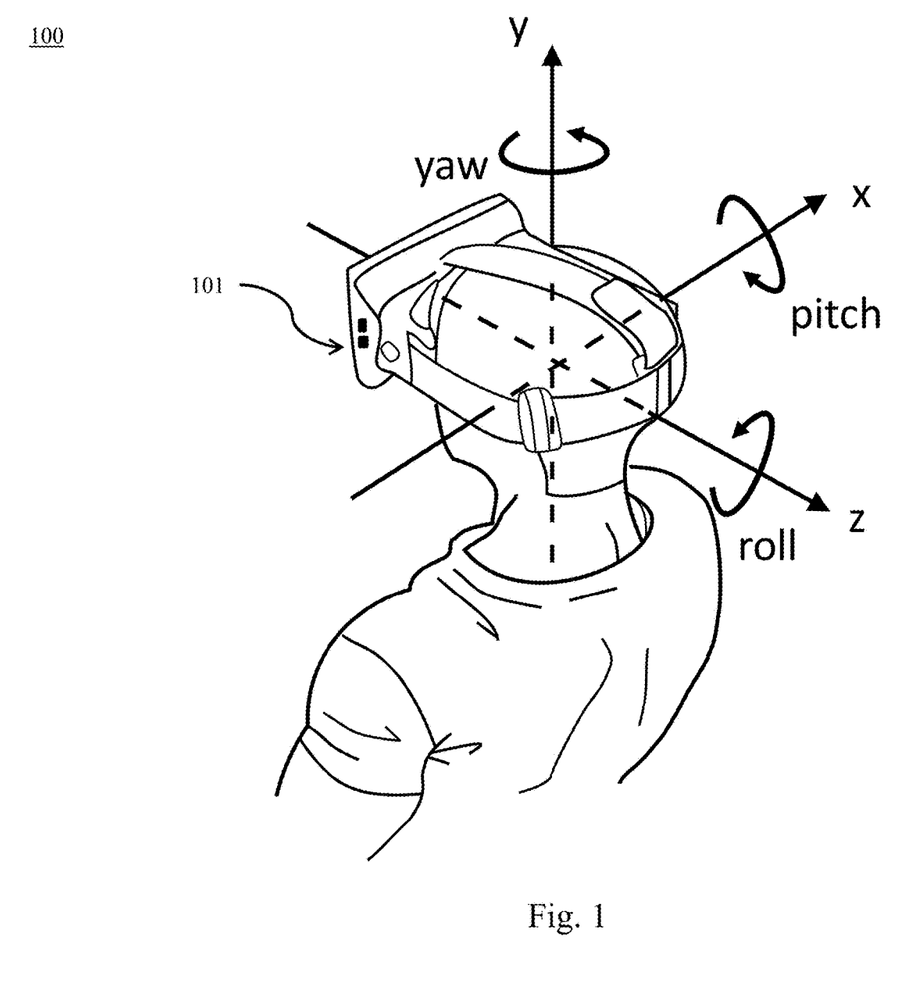
FIG. 1 illustrates an exemplary virtual reality headset according to embodiments of the present disclosure.

With reference now to FIG. 1, an exemplary virtual reality headset is illustrated according to embodiments of the present disclosure. In various embodiments, system 100 is used to collected data from motion sensors including hand sensors (not pictured), sensors included in headset 101, and additional sensors such as sensors placed on the body (e.g., torso, limbs, etc.) or a stereo camera. In some embodiments, data from these sensors is collected at a rate of up to about 150 Hz. As illustrated, data may be collected in six degrees of freedom: X axis translation—left/right; Y axis translation—up/down/height; Z axis translation—forward/backward; P—pitch; R—roll; Y—yaw. As set out herein, this data may be used to track a user's overall motion to facilitate interaction with a virtual environment and to evaluate their performance. Pitch/Roll/Yaw may be calculated in Euler angles.

Figure 2:
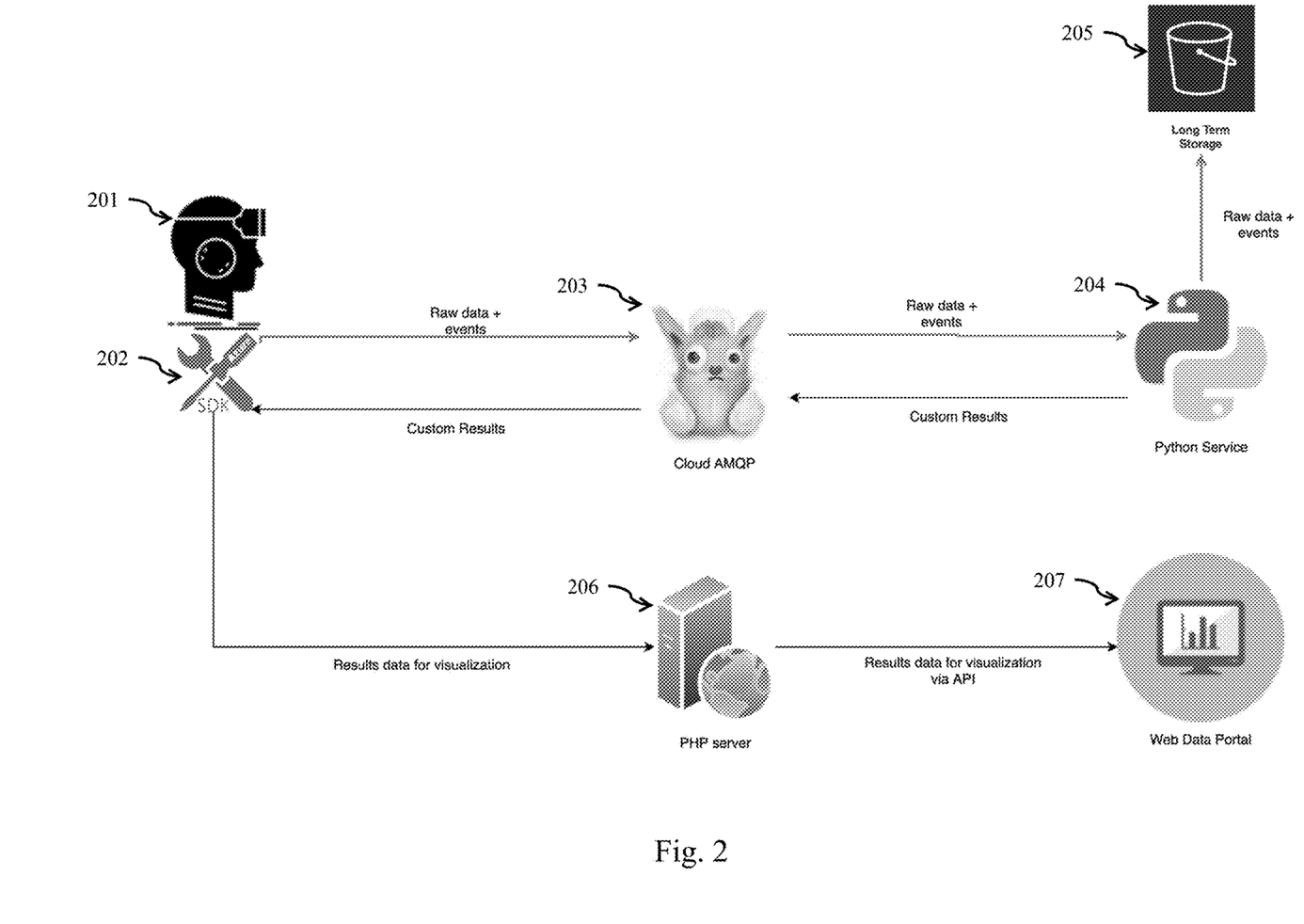
FIG. 2 illustrates a system for dynamic assessment of upper extremity impairments according to embodiments of the present disclosure.

Referring to FIG. 2, a system for dynamic assessment of upper extremity impairments is illustrated according to embodiments of the present disclosure.

XR device 201 includes local SDK 202, which sends raw data and events to, and receives back results from message queue 203. In some embodiments, message queue is a Advanced Message Queuing Protocol queue. Results received from queue 203 may include results for visualization and tracking post-assessment.

Message queue 203, which in some embodiment is a Cloud AMQP queue, enables SDK 202 to stream raw data and events and the module 204 to stream back results to the SDK in real-time.

Long Term Storage 205 enables long term storage of raw data and events. Transition of data to long term storage enables offline R&D while sustaining a lean environment on the server side.

Module 204 performed the algorithmic steps to provide insights on user sessions in real time. In some embodiments, a plurality of movement features of a user are computed based on their motion within a virtual environment. In some embodiments, these features include measurements of range of motion, quality of movement, response time, peak velocity, efficiency, fatigue, and/or tremor. The computation of each of these measurements are described further below. In some embodiments, measurements are presented to a user. In some embodiments, the measurements are compared to predetermined thresholds to determine quality of upper extremity motion. For example, values below certain threshold may be indicative of the presence of a movement disorder. In some embodiments, the measurements are aggregated into a composite score, for example by averaging a score of each of the plurality of features. In some such embodiments, the composite score is compared to a threshold value to determine quality of upper extremity motion. For example, a value below a certain threshold may be indicative of the presence of a movement disorder. In some embodiments, the measurements or scores are provided to a learning system to produce an output indication of the presence or absence of one or more movement disorder. In some embodiments, the measurements or scores are provided to an arithmetic model that combines them to predict a known clinical index.

In some embodiments, a feature vector is provided to a learning system. Based on the input features, the learning system generates one or more outputs. In some embodiments, the output of the learning system is a feature vector.

In some embodiments, the learning system comprises a SVM. In other embodiments, the learning system comprises an artificial neural network. In some embodiments, the learning system is pre-trained using training data. In some embodiments training data is retrospective data. In some embodiments, the retrospective data is stored in a data store. In some embodiments, the learning system may be additionally trained through manual curation of previously generated outputs.

In some embodiments, the learning system, is a trained classifier. In some embodiments, the trained classifier is a random decision forest. However, it will be appreciated that a variety of other trainable classifiers are suitable for use according to the present disclosure, including random decision forests, linear classifiers, support vector machines (SVM), or artificial neural networks (ANN) such as recurrent neural networks (RNN) or convolutional neural network (CNN). In various embodiments, the learning systems described herein use artificial neural networks, and more particularly convolutional neural networks.

Suitable artificial neural networks include but are not limited to a feedforward neural network, a radial basis function network, a self-organizing map, learning vector quantization, a recurrent neural network, a Hopfield network, a Boltzmann machine, an echo state network, long short term memory, a bi-directional recurrent neural network, a hierarchical recurrent neural network, a stochastic neural network, a modular neural network, an associative neural network, a deep neural network, a deep belief network, a convolutional neural networks, a convolutional deep belief network, a large memory storage and retrieval neural network, a deep Boltzmann machine, a deep stacking network, a tensor deep stacking network, a spike and slab restricted Boltzmann machine, a compound hierarchical-deep model, a deep coding network, a multilayer kernel machine, or a deep Q-network.

In various embodiments, the system described herein may provide a fully articulated upper-extremity-tracking system for VR/AR. In various embodiments, the system may determine and record three-dimensional position information associated with one or more locations on the upper extremities (e.g., hands, arms, shoulders, etc.). In various embodiments, the three-dimensional position information may be determined and recorded in real time. In various embodiments, three-dimensional position information may be determined at anatomical joints. In various embodiments, the system may interpolate three-dimensional position information between discrete data points to determine three-dimensional position information for the rest of the particular anatomy (e.g., hand, arm, shoulder, etc.). In various embodiments, one or more distances between joints may be interpolated as a straight line. In various embodiments, one or more distances between joints may be interpolated as a curve. In various embodiments, a not all joint locations may be determined.

In various embodiments, the system may determine three-dimensional positional data via one or more cameras. In various embodiments, the one or more cameras may include one or more monochrome cameras. In various embodiments, the system may not use active depth-sensing technology or any additional equipment (such as instrumented gloves). In various embodiments the system may user one or more sensors, such as handheld sensors, for determining three-dimensional information of a body part (e.g., hand, arm, shoulder, etc.). In various embodiments, two or more cameras (e.g., four cameras) may be used to determine three-dimensional position information. In various embodiments, a learning system may be applied to determine three dimensional position information of one or more anatomical joints for which three-dimensional position information is not determined by a sensor (e.g., cameras). In various embodiments, the three-dimensional position information may be input to a learning system to determine a three-dimensional position of the anatomy. In various embodiments, model-based tracking may be used to determine three-dimensional position of the anatomy. In various embodiments, model-based tracking may be combined with a learning system (e.g., a deep neural network).

In various embodiments, an anatomical volume may be generated for upper-extremity-tracking based on the three-dimensional position information that is measured and/or determined by a learning system. In various embodiments, processing may be performed entirely on-device. In various embodiments, data (e.g., three-dimensional positional information) may be transmitted to a remote server for processing.

In various embodiments, a learning system (e.g., a deep neural network) is used to predict the location of a user's hands as well as landmarks, such as joints of the hands. In various embodiments, the landmarks are then used to reconstruct a multi degree-of-freedom (e.g., 26 DOF) pose of the user's hands and fingers. In various embodiments, a resulting 3D model may be generated that includes the configuration and/or surface geometry of the hand.

Server 206 provides an open API for posting assessment sessions and making them accessible through web interface 207.

In various embodiments, an event recorder is included in SDK 202. The event recorded enables recording all game events data during XR sessions. This data is recorded so it can be analyzed and produce insights regarding the results of the XR session. All the events that occur during the XR sessions, such as appearance/disappearance of object in the XR environment or patient-environment interaction are stored in a relevant object and recorded through an API call to a log method on the relevant game controller.

In various embodiments, each event contains pre-defined data related to: Collected sensor's data in 6 DOF described above; Unity/Unreal engines calls that are related to the XR games and scenes. The event recorder events are combined with the raw data collected, enabling simulation of the full XR environment, with all relevant stimulus, and to perform further analysis to drive insights on upper extremity performance.

Figure 3:
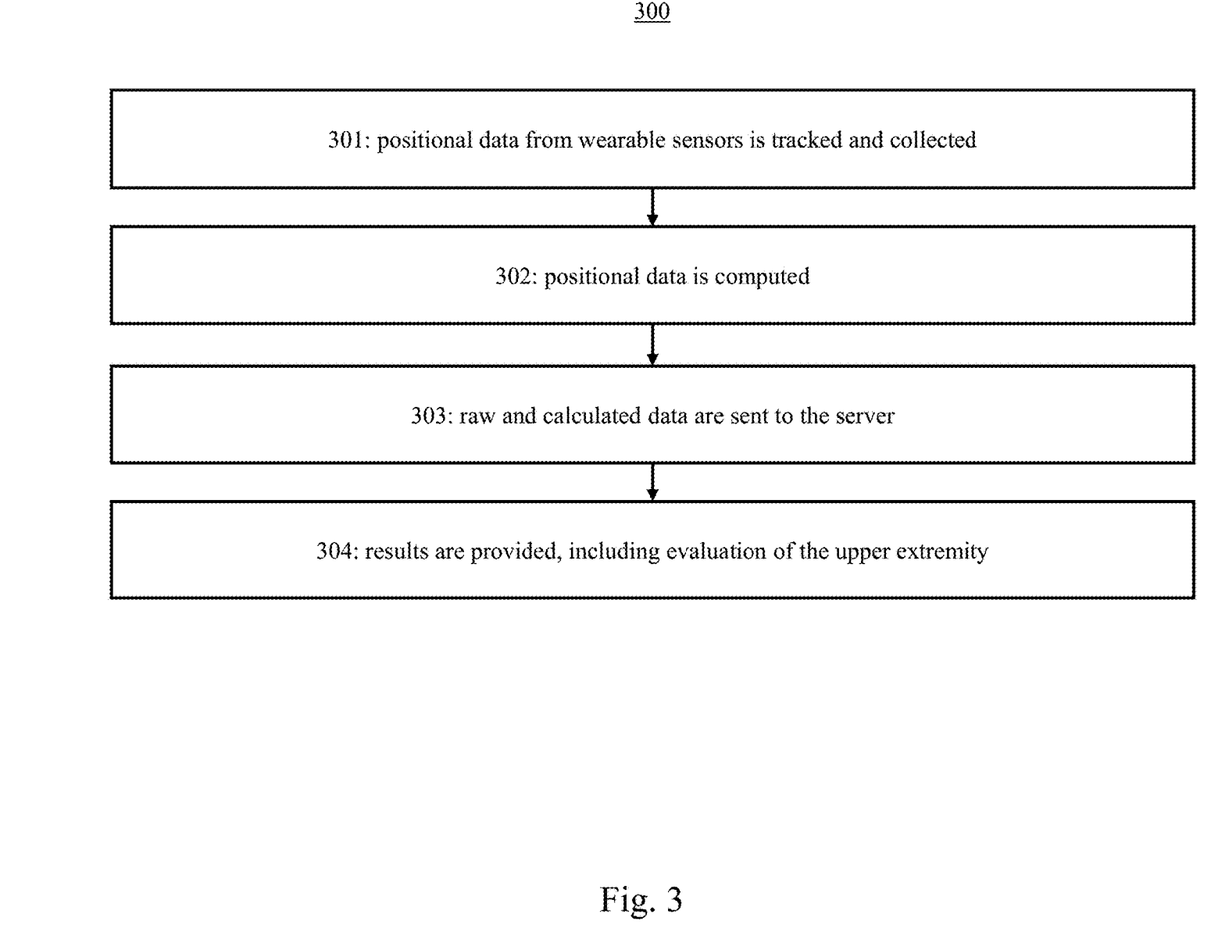
FIG. 3 illustrates a method of upper extremity evaluation according to embodiments of the present disclosure.

Referring to FIG. 3, an exemplary method of evaluating upper extremity according to embodiments of the present disclosure is illustrated.

At 301, positional data from wearable sensors (e.g., head mounted display, hand controllers) is tracked and collected (e.g., at a rate of up to 150 Hz). Each test/assessment includes guidance as to which sensors are needed (e.g., right or left controller) and in which way, and includes guidance to the precise upper extremity movement required from the patient.

At 302, three-dimensional positional data is computed (e.g., by the Python service) to enable real-time kinematic upper extremity calculations in 3 dimensions.

At 303, raw and calculated data are sent to the server, where they are logged, and additional analysis is performed.

At 304, results are sent from the python service via SDK to view with a final report presenting evaluation of the upper extremity. In various embodiments, results can also be viewed through a web platform.

In various embodiments, a variety of indicators may be used for upper extremity assessment. In various embodiments, indicators include range of motion, quality of movement, response time, peak velocity, efficiency, fatigue, and/or tremor. In one example, an indicator may include hand fatigue, arm fatigue, etc. In another example, an indicator may include hand tremor used to assess (e.g., quantify) tremor of the hand and/or fingers due to, for example, Parkinson's.

Range of motion—Kinematic data enables understanding and mapping of a user's body by creating a computed virtual body that is synchronized to the physical body using it. By mapping the physical body to a computed system, a joint's position is determined in space on a 3-dimensional Cartesian system. Based on the position in space of the virtual body's joints, which define the axis of the movement while measuring active range of motion, and based on the direction of the movement in space, the active range of motion of one's upper extremity movements is computed. Range of motion is calculated from predetermined range of motion test trajectories. The output will be the maximum capabilities that did not filtered as an abnormal behavior.

In various embodiments, a starting three-dimensional coordinate and an ending three-dimensional coordinate may be determined. The starting and ending coordinates may be used to determine a range of motion of a joint (e.g., finger, wrist, elbow, shoulder, etc.) of the user.

In various embodiments, the user may be presented with one or more sets of instructions to move one or more body parts (e.g., one or both arms) in a particular direction to thereby assess range of motion of a joint (e.g., shoulder joint). In various embodiments, range of motion may be used to determine a likely disorder and/or likely disease of a joint. In various embodiments, the determined likely disorder and/or likely disease may be presented to a user. In various embodiments, the determined likely disorder and/or likely disease may be transmitted to a healthcare provider and/or stored in a patient's electronic medical record. In various embodiments, three-dimensional position information may be recorded for the one or more body parts. In various embodiments, as described above, the three dimensional position information may be determined using one or more sensors (e.g., handheld 3D position sensors) associated with one or more body parts (e.g., fingers, hands, lower arm, upper arm, specific joints, etc.). In various embodiments, the three-dimensional position information may be determined from one or more cameras. In various embodiments, the three-dimensional position information may be used to construct a virtual representation of the user anatomy, which may be used to assess range of motion.

In various embodiments, each set of instructions to move one or more body parts is associated with a target path and/or a target position of the body part. In various embodiments, the recorded three-dimensional position info may define a recorded path and/or one or more recorded position (e.g., a maximum/minimum extension position, maximum/minimum flexion position). In various embodiments, the recorded path may be compared to the target path to determine similarity of the target and recorded paths. In various embodiments, the three-dimensional position data representing the recorded path may be input to a learning system (e.g., a neural network) trained to determine path similarity. In various embodiments, the one or more recorded positions may be compared to one or more target positions to determine similarity of the target and recorded positions. In various embodiments, the three-dimensional position data representing the recorded path may be input to a learning system (e.g., a neural network) trained to determine path similarity. In various embodiments, the three-dimensional position information may be used to determine a quantitative metric representative of impairment. For example, if a patient is only able to move an arm 70% through a complete motion instructed by the system, the user may be assessed as having a 30% impairment.

Quality of movement—Movement smoothness is a quality related to the continuity or non-intermittency of a movement, independent of its amplitude and duration. Intermittency in this context refers to movements that alternately decelerate and accelerate, and more intermittency corresponds to unsmooth movements. Movement intermittency is typically observed as dips in a movement's speed profile or finite non-zero periods of zero speed (movement arrest) during an ongoing movement. A movement is perceived to be smooth when it happens continuously without any interruptions. Smooth movements are a characteristic feature of healthy and well-trained motor behavior. Movement smoothness increases with neural development and motor learning. Also, movement smoothness has been identified as an important marker of motor recovery in patients with stroke, which correlates standard scales of motor impairments such as the Fugl-Meyer assessment. Smooth movements are believed to be the result of effort minimization—an important characteristic of motor learning. Smoothness may also be related to other fundamental determinants of sensorimotor control such as spatiotemporal coordination. Although smoothness can provide valuable information about sensorimotor control and be used for patient's assessment during neurorehabilitation, there is no consensus on the best method to quantify smoothness. For instance, at least 8 different measures have been used in various studies, which makes it difficult to compare the results from these different studies. The choice of factors to assess sensorimotor control (such as smoothness) is generally based on some observed invariant of healthy/trained sensorimotor behavior. For any chosen factor, the conception of a measure for its evaluation is guided by a model of healthy behavior. In the case of movement smoothness, nearly all existing measures are motivated by the stereotypical smooth kinematics of discrete arm and neck movements of healthy subjects, which may correspond to the single peaked bell-shaped speed profile of point-to-point reaching.

In various embodiments, smoothness trajectory is processed by several methods in order to compare trajectories with the same constraints. In various embodiments, missing samples are imputed using cubic interpolation; the beginning of it sliced in order to start from the moment the movement started (above minimum velocity & Doppler, after a calculated response time); the end of it sliced in order to maintain velocity, direction, and being inside a calculated collider.

In various embodiments, from the processed trajectory, an absolute jerk (or jolt) curve is calculated. In various embodiments, the area under a curve is used as the main smoothness indicator. In various embodiments, that value is normalized using the time period of the movement and the mean velocity in order to get a final indicator—the area under a dimensionless-absolute-jerk curve.

In various embodiments, in order to get a score in the range of 0-100, optimization is used to find the best fitting score function using a variety of trajectories.

In various embodiments, quantification of the noise in a path of a body part may be performed to thereby determine a metric for smoothness of motion. In various embodiments, the metric may include a signal-to-noise ratio. In various embodiments, the signal-to-noise ratio may be represented in a decibel scale. In various embodiments, noise may be estimated by filtering out at least some (e.g., most) of the noise. In various embodiments, suitable filters may include: a low pass filter, a high pass filter, a band pass filter, a Kalman filter, a Gaussian filter, an averaging filter, a median filter, a gradient filter, a smoothing non-linear filter, or any other suitable filter. In various embodiments, three-dimensional position data may be input to a learning system (e.g., a neural network) to thereby determine a metric for smoothness of motion.

Response time—Using the VR scene and games combined with the event recorder, a stimulus is presented inside the virtual world. The location and appearance time are known. The initiation of a movement towards that stimulus can be detected, thus measuring the reaction time of a user. A visual, auditory, or haptic stimulus is provided in the virtual environment, and with the event recorder mechanism, the user's exposure to this stimulus is tracked. The response time to the stimulus may then be determined.

Response time trajectory is processed by several methods in order to compare trajectories with the same constraints. Missing samples are imputed using cubic interpolation; the beginning and end of it sliced using to start from the moment the user noticed the button to the moment he pressed it.

The calculation of response time is based on several models that are trained in order to fit the different conditions than minimizing the cost function. Those models are used to find the time window that contains the real response time, then shrink it down to find it. The features of those models based on velocity, acceleration, and Doppler. Those features modified by several mechanisms such as normalizing values and creating ratios.

System and methods for determining response time using a VR scene and/or game are described in U.S. Patent Application Pub. No. 2020/0129106 (Ser. No. 16/664,412), which is incorporated by reference herein in its entirety.

Peak velocity—Understanding the positional data of each hand sensor, in known times, combined with the event recorder described above, the velocity of each movement may be computed. A movement's peak velocity is the highest velocity that was achieved during a movement. Peak velocity is a valuable indicator for assessing upper extremity.

Peak velocity trajectory is processed by several methods in order to compare trajectories with the same constraints. Missing samples are imputed using cubic interpolation; the beginning of it sliced in order to start from the moment the movement started (after a calculated response time, when entering a calculated collider); the end of it sliced in order to maintain velocity, direction, and being inside a calculated collider.

Moving averages are used to filter high velocities that result from sampling errors. The maximum average of moving averages that passed the filter is taken as the peak velocity.

Efficiency—the efficiency of movement is an indicator of distance, presenting the ratio between the length of the hand's path during the movement and the length of the ideal theoretical trajectory. It represents how efficient was a movement, leaning on the assumption that the shortest line between two points is a straight line. This provides a valuable indicator for assessing upper extremity for spinal cord injuries patients.

Efficiency trajectory is processed by several methods in order to compare trajectories with the same constraints. Missing samples are imputed using cubic interpolation; the beginning and end of it sliced using a calculated collider and rules of movement, in order to specify the task and extract both the real trajectory and the most efficient one. The arc length of both trajectories is calculated. The efficiency score is calculated to be the arc length of the real trajectory divided by the arc length of the optimal trajectory multiplied by 100.

Fatigue—Muscle fatigue has been implicated in both acute and overuse injuries. Fatigue impairs muscle strength, reaction time, and proprioception. Due to these changes, muscle fatigue may limit the ability to respond to sudden perturbations and can cause people to alter their kinematic patterns. Many factors influence the way that people change their movement patterns after fatigue. In particular, fatigue that is localized in a specific muscle group causes greater changes in muscle coordination and movement amplitude and speed compared to fatigue that is widespread over several muscles. Studies identified significant movement changes in trunk, shoulder, and elbow kinematics after proximal muscle fatigue in a repetitive, timed movement tasks. In contrast, after distal muscle fatigue, there were changes mainly in wrist and hand movement. Changes in kinematics can be recognized and mapped in VR using the described above methods, thus assessing fatigue of the upper extremity.

Fatigue is calculated from the existing indicator values. In particular, timestamps of each prior score and the score values are reviewed to determine if user capabilities are decreasing over time.

Tremor—Regular samples (e.g., taken at a frequency of up to 150 HZ) enable detection of even minor kinematic changes in the virtual body, reflecting directly on the physical body. In various embodiments, methods to quantify tremor may be similar to those described above to measure quality of motion (e.g., smoothness). For example, noise corresponding to tremor may be determined from an otherwise smooth motion. In various embodiments, amplitude of the noise may be determined. In various embodiments, an average amplitude may be determined. In various embodiments, statistics of the noise may be determined, such as, for example, average, median, variance, standard deviation, minimum, maximum, etc. Understanding the kinematic changes pattern of tremor enables detection of essential tremor and differentiation of pathological tremor. Primary upper limb movements of Parkinson's disease tremor can be quantified using a VR system as set out herein.

An indication of tremor is determined using the full trajectory of all available sensors. The trajectories are processed using cubic interpolation in order to impute missing samples. Then, a smoothed trajectory is created, and the mean of all differences from it are calculated where all values are reduced as a function of velocity and direction.

In order to get a score in the range of 0-100, optimization is used to find the best fitting score function using a variety of trajectories.

Figure 4:
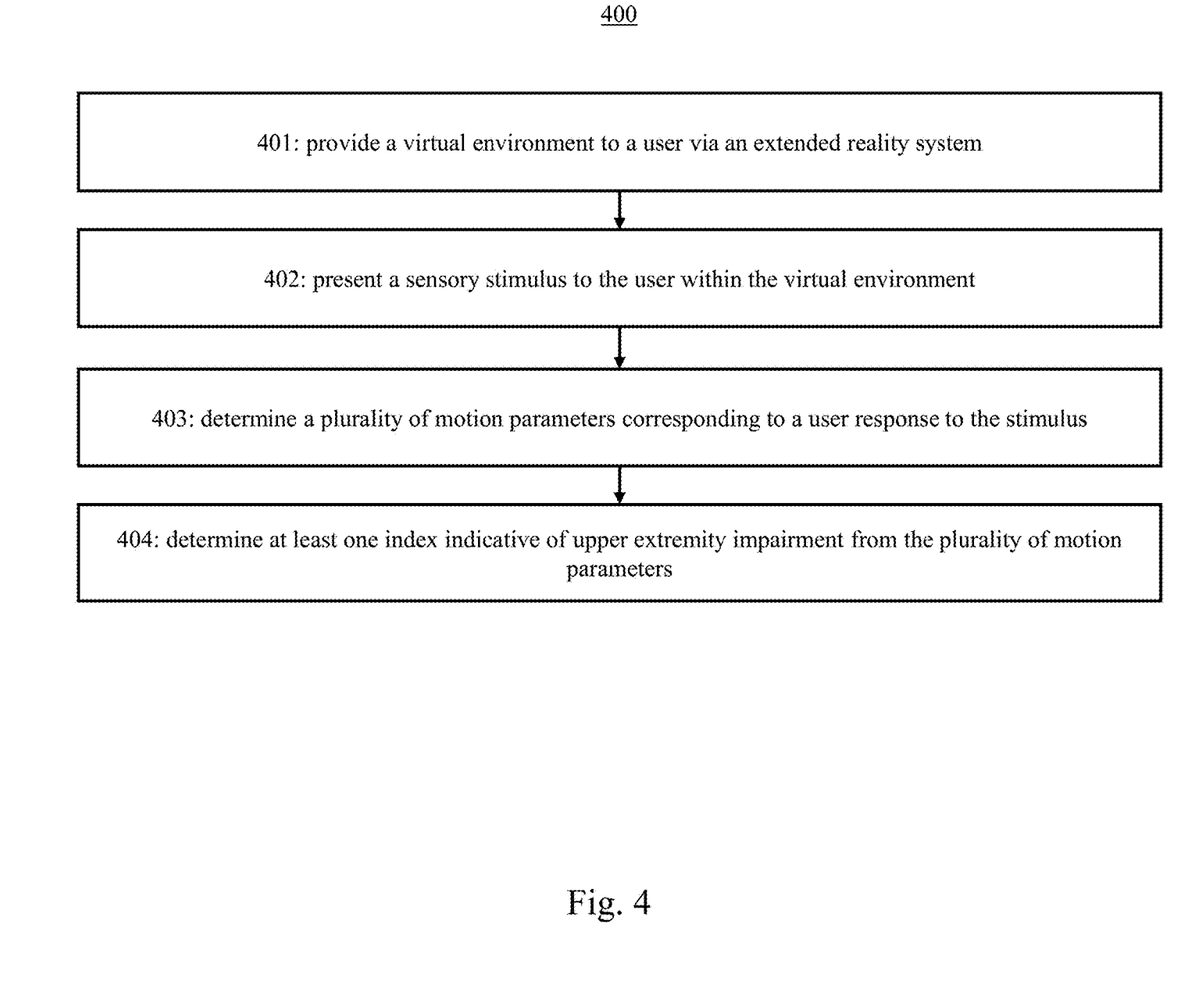
FIG. 4 is a flow chart illustrating an exemplary method of upper extremity evaluation according to embodiments of the present disclosure.

FIG. 4 is a flow chart illustrating an exemplary method of upper extremity evaluation according to embodiments of the present disclosure. At 401, a virtual environment is provided to a user via an extended reality (e.g., AR or VR) system.

At 402, a sensory stimulus is presented to the user within the virtual environment. In various embodiments, the sensory stimulus may include one or more prompt. In various embodiments, the sensory stimulus may include one or more sets of instructions directing the user to move one or more body part. In various embodiments, the system may determine (e.g., in real time) three-dimensional position information of the one or more body part. In various embodiments, the system may record the three-dimensional position information at a database (e.g., local database or cloud/remote database). In various embodiments, the system may generate a virtual representation of the one or more body part. In various embodiments, the virtual representation may include modelling one or more joints based on the three-dimensional position information.

At 403, a plurality of motion parameters is determined corresponding to a user response to the stimulus. In various embodiments, the plurality of motion parameters includes at least one of: range of motion, quality of movement, response time, peak velocity, efficiency, fatigue, and/or tremor. In various embodiments, a starting three-dimensional coordinate and an ending three-dimensional coordinate may be determined. The starting and ending coordinates may be used to determine a range of motion. In various embodiments, a path may be determined of the one or more body part. In various embodiments, the path may correspond to one or more discrete locations on the one or more body part. In various embodiments, the one or more discrete locations may correspond to one or more joints (e.g., finger joints, wrist, elbow, shoulder, etc.) In various embodiments, the plurality of motion parameters may include a similarity metric of a recorded path of one or more body part and a target path. In various embodiments, the plurality of motion parameters may include a signal-to-noise ratio where the noise is related to smoothness of motion and/or involuntary movements (e.g., tremor) of the one or more body parts.

In various embodiments, three-dimensional position information may be input to one or more learning systems (e.g., artificial neural networks) where each learning system is trained to determine one or more of the motion parameters. In various embodiments, the one or more learning systems may determine a range of motion In various embodiments, the three-dimensional position information is fed to a pre-trained convolutional neural network (CNN). In various embodiments, the CNN is used as a feature generator. In various embodiments, earlier layers of the neural network capture generic features of the three-dimensional position information. For feature generation, a feature vector of size 4096 may be harvested at the output of the first fully connected layer of the network. In various embodiments, the position data may be classified using a support vector machine (SVM) classifier. In various embodiments, the classifier may classify the range of motion, for example, as being impaired, partially impaired, of full. In various embodiments, the classifier may classify the motion as having tremor or no tremor. In various embodiments, the classifier may classify the motion as smooth, partially smooth, or rough. In various embodiments, the classifier may classify the motion as fatigued or nominal. In various embodiments, the classifier may include any suitable number of categories for classifying a particular motion parameter.

At 404, at least one index indicative of upper extremity impairment is determined from the plurality of motion parameters. In various embodiments, a learning system or combination of learning systems may be used to determine the at least one index. In various embodiments, any of the learning system described above may be applied to determine the at least one index.

Figure 5:
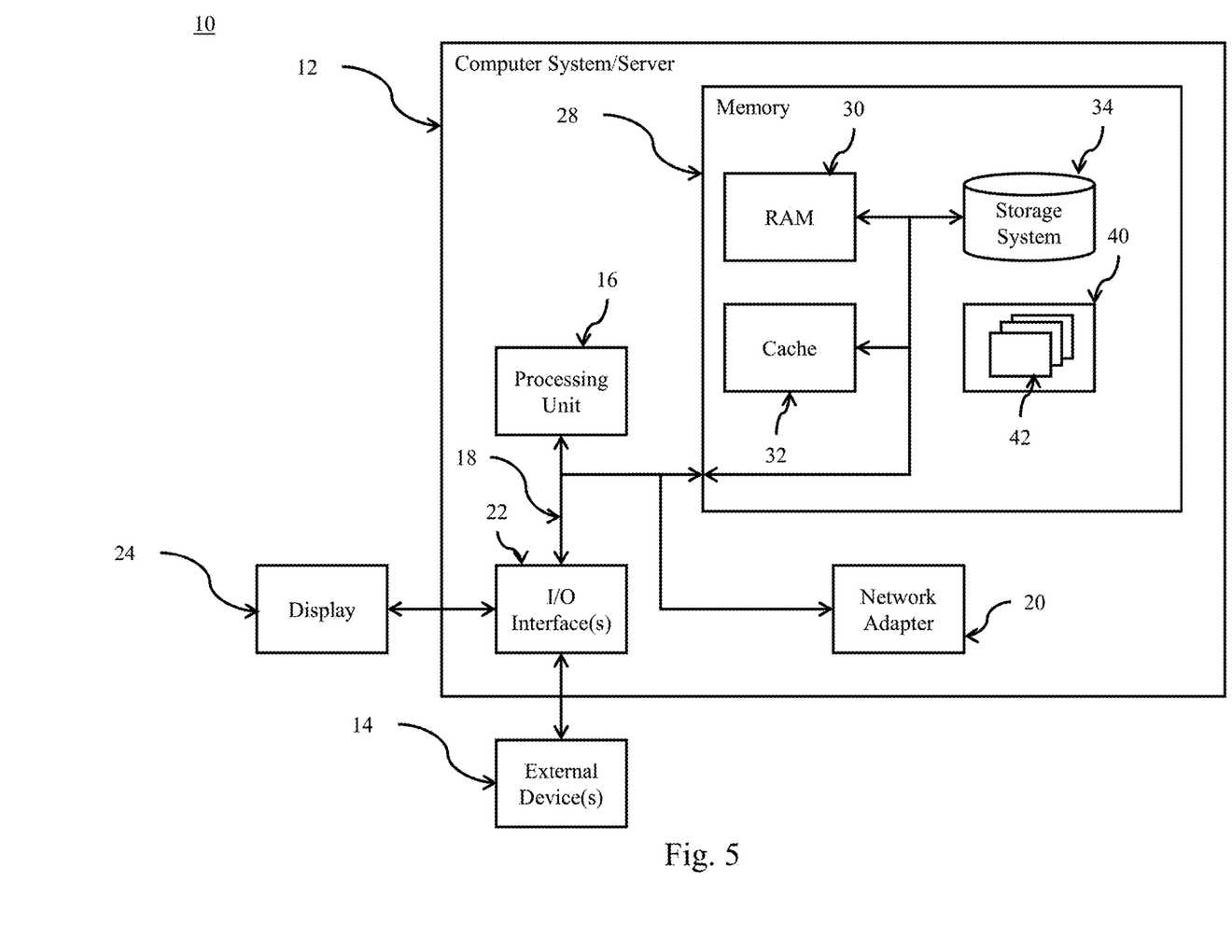
FIG. 5 depicts an exemplary computing node according to embodiments of the present disclosure.

Referring now to FIG. 5, a schematic of an example of a computing node is shown. Computing node 10 is only one example of a suitable computing node and is not intended to suggest any limitation as to the scope of use or functionality of embodiments of the invention described herein. Regardless, computing node 10 is capable of being implemented and/or performing any of the functionality set forth hereinabove.

In computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    providing a virtual environment to a user via an extended reality system comprising a head-mounted display and a plurality of body-worn motion sensors worn by the user;
    receiving a target path;
    presenting a sensory stimulus to the user within the virtual environment, the sensory stimulus instructing the user to follow the target path by moving one or more body parts of the user;
    determining three-dimensional position information for the one or more body parts, the three-dimensional position information defining a recorded path;
        wherein the determining the three-dimensional position information comprises fusing inertial measurement unit (IMU) data from the plurality of body-worn motion sensors with optical tracking data from the head-mounted display using a hardware-implemented sensor fusion algorithm to improve a spatial accuracy metric and a robustness metric of the recorded path;
    determining a plurality of motion parameters corresponding to a user response to the sensory stimulus, wherein determining the plurality of motion parameters comprises:
        comparing the recorded path to the target path;
        determining a smoothness metric of the recorded path by:
            determining a signal-to-noise ratio of the recorded path, and
            applying a filter to the recorded path;
        determining starting coordinates and ending coordinates of the recorded path;
        determining a first time period from presentation of the sensory stimulus to when motion of the one or more body parts begins; and
        determining a second time period for motion between the starting coordinates and the ending coordinates; and
    determining at least one index indicative of upper extremity impairment from the plurality of motion parameters.

2. The method of claim 1, wherein the plurality of motion parameters comprises range of motion, quality of movement, response time, peak velocity, efficiency, fatigue, and/or tremor.

3. The method of claim 1, wherein determining the at least one index comprises providing the plurality of motion parameters to a learning system.

4. The method of claim 3, wherein the learning system is a trained classifier.

5. The method of claim 3, wherein the learning system is a trained artificial neural network.

6. The method of claim 1, wherein comparing the recorded path to the target path comprises determining similarity between the recorded path and the target path.

7. The method of claim 1, wherein determining the smoothness metric comprises determining an amplitude of noise in the recorded path.

8. The method of claim 1, wherein the determining the three-dimensional position information comprises mapping one or more joints of the user.

9. The method of claim 8, wherein the one or more joints comprise a shoulder or elbow, the method further comprising determining a change in kinematics of the one or more joints.

10. The method of claim 1, further comprising determining a ratio between a first length of a path of a hand from the recorded path and a second length associated with the target path.

11. The method of claim 1, wherein a velocity is determined based on the second time period, the starting coordinates, and the ending coordinates.

12. The method of claim 1, wherein the target path is received from a remote server.

13. The method of claim 12, wherein the remote server comprises an electronic medical record.

14. A system comprising:
an extended reality system, adapted to display a virtual environment to a user, comprising:
a head-mounted display, and
a plurality of body-worn motion sensors worn by the user;
a computing node comprising a computer readable storage medium having program instructions embodied therewith, the program instructions executable by a processor of the computing node to cause the processor to perform a method comprising:
providing the virtual environment to the user via the extended reality system;
receiving a target path;
presenting a sensory stimulus to the user within the virtual environment, the sensory stimulus instructing the user to follow the target path by moving one or more body parts of the user;
determining, from the plurality of body-worn motion sensors, three-dimensional position information for the one or more body parts, the three-dimensional position information defining a recorded path;
wherein determining the three-dimensional position information comprises fusing inertial measurement unit (IMU) data from the plurality of body-worn motion sensors with optical tracking data from the head-mounted display using a hardware-implemented sensor fusion algorithm to improve a spatial accuracy metric and a robustness metric of the recorded path;
determining a plurality of motion parameters corresponding to a user response to the sensory stimulus from the plurality of body-worn motion sensors, wherein determining the plurality of motion parameters comprises:
comparing the recorded path to the target path;
determining a smoothness metric of the recorded path by:
determining a signal-to-noise ratio of the recorded path, and
applying a filter to the recorded path;
determining starting coordinates and ending coordinates of the recorded path;
determining a first time period from presentation of the sensory stimulus to when motion of the one or more body parts begins; and
determining a second time period for motion between the starting coordinates and the ending coordinates; and
determining at least one index indicative of upper extremity impairment from the plurality of motion parameters.

15. A computer program product comprising a computer readable storage medium having program instructions embodied therewith, the program instructions executable by a processor to cause the processor to perform a method comprising:
providing a virtual environment to a user via an extended reality system comprising a head-mounted display and a plurality of body-worn motion sensors worn by the user;
receiving a target path;
presenting a sensory stimulus to the user within the virtual environment, the sensory stimulus instructing the user to follow the target path by moving one or more body parts of the user;
determining three-dimensional position information for the one or more body parts, the three-dimensional position information defining a recorded path;
wherein determining the three-dimensional position information comprises fusing inertial measurement unit (IMU) data from the plurality of body-worn motion sensors with optical tracking data from the head-mounted display using a hardware-implemented sensor fusion algorithm to improve a spatial accuracy metric and a robustness metric of the recorded path;
determining a plurality of motion parameters corresponding to a user response to the sensory stimulus, wherein determining the plurality of motion parameters comprises:
comparing the recorded path to the target path;
determining a smoothness metric of the recorded path by:
determining a signal-to-noise ratio of the recorded path, and
applying a filter to the recorded path;
determining starting coordinates and ending coordinates of the recorded path;
determining a first time period from presentation of the sensory stimulus to when motion of the one or more body parts begins; and
determining a second time period for motion between the starting coordinates and the ending coordinates; and
determining at least one index indicative of upper extremity impairment from the plurality of motion parameters.

* * * * *